H. RICHARDSON.
WEIGHING, BAGGING, AND PACKING APPARATUS.
APPLICATION FILED AUG. 4, 1906.
962,918.
Patented June 28, 1910
2 SHEETS—SHEET 1.
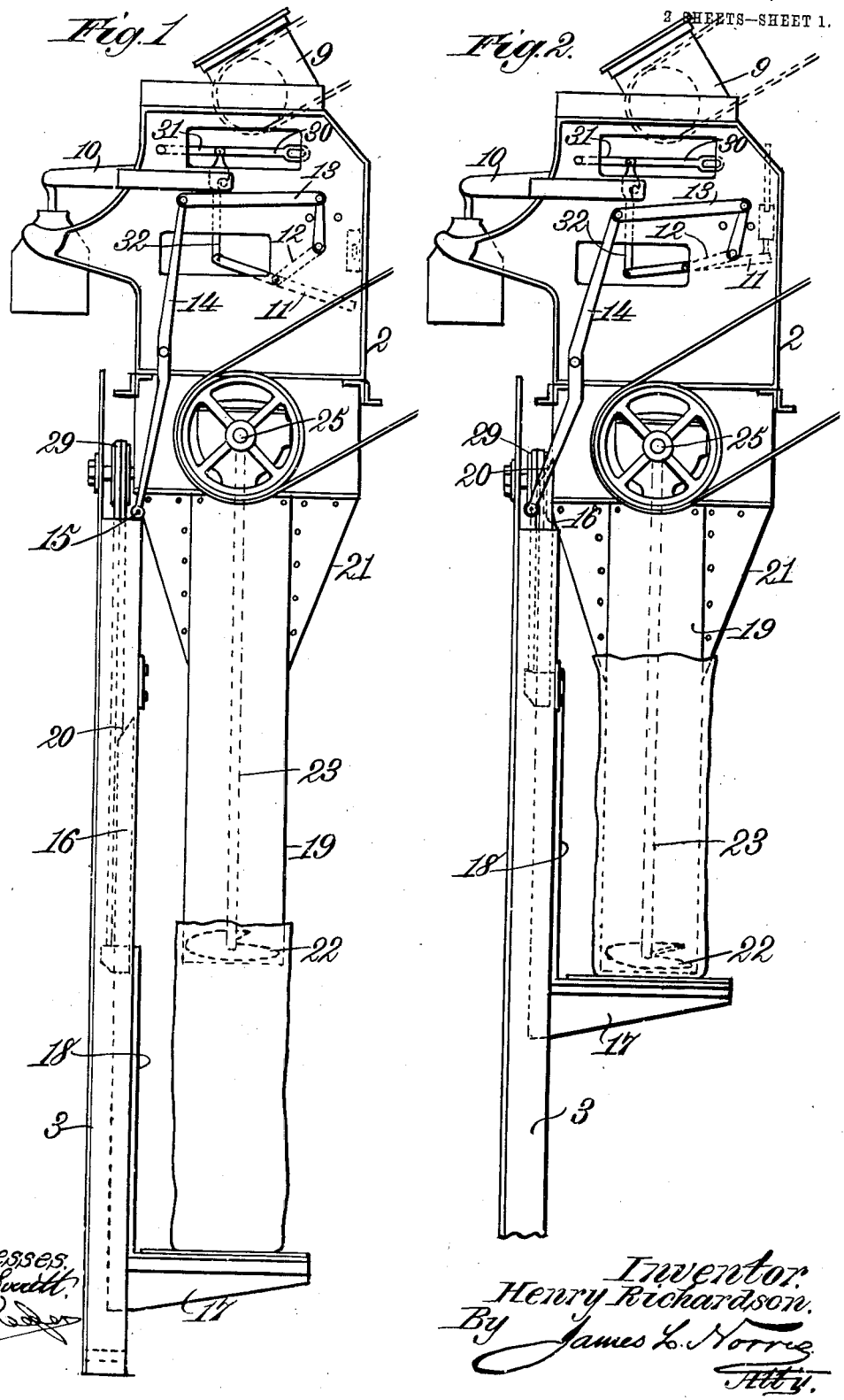
Witnesses
Inventor
Henry Richardson.
By James L. Norris
Atty.

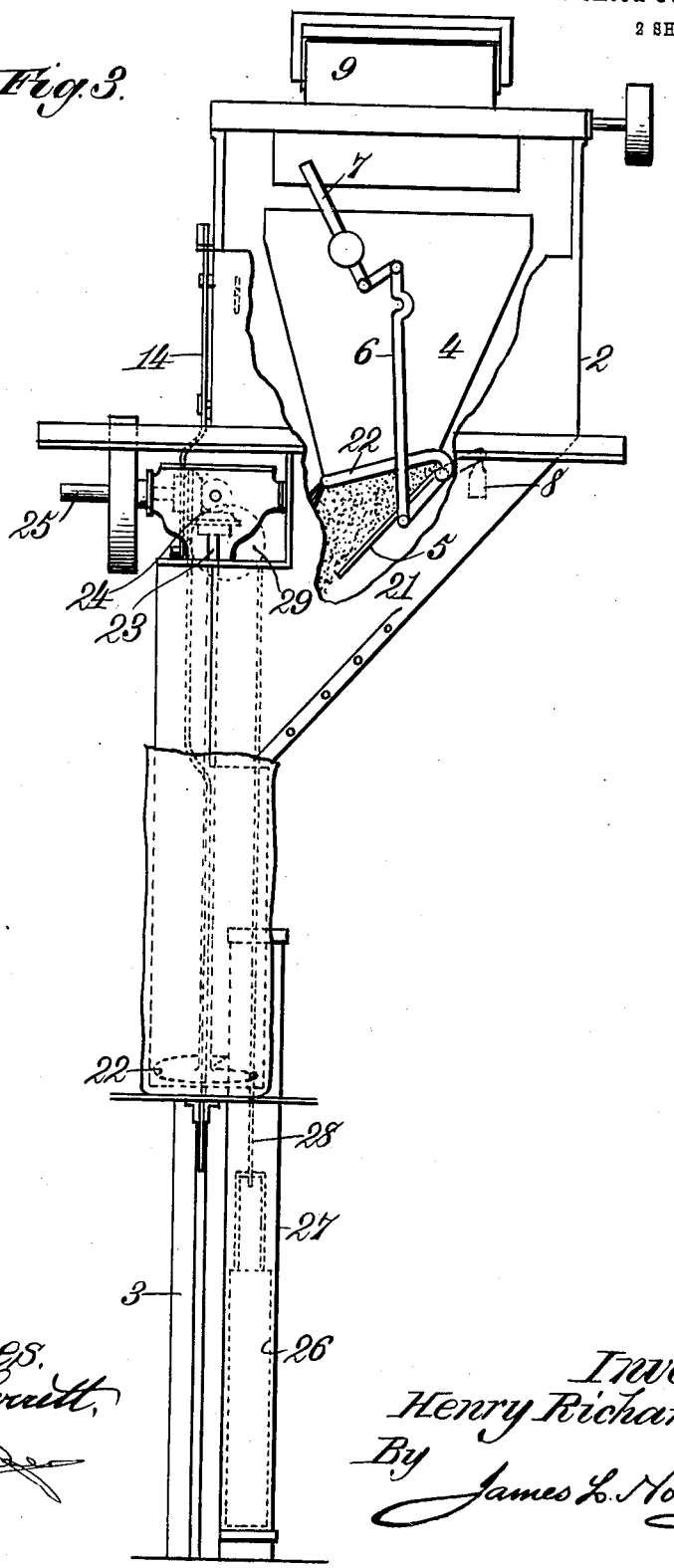

UNITED STATES PATENT OFFICE.

HENRY RICHARDSON, OF NEW YORK, N. Y.

WEIGHING, BAGGING, AND PACKING APPARATUS.

962,918. Specification of Letters Patent. Patented June 28, 1910.

Application filed August 4, 1906. Serial No. 329,260.

*To all whom it may concern:*

Be it known that I, HENRY RICHARDSON, a citizen of the United States, residing at New York, in the county of New York and State of New York, have invented new and useful Improvements in Weighing, Bagging, and Packing Apparatus, of which the following is a specification.

This invention relates to weighing, bagging and packing apparatus. I employ this designation as a convenient one; for example, it is not necessary that bags be used in the apparatus, the term "bagging" being used in a generic sense to cover the act of filling a receptacle with a charge of material. This receptacle may, as will be understood from the title, be a bag; it may, however, be a box, carton, or any other receiver of material. The charges to be packed in the receptacles are preferably weighed, whereby accuracy is secured, and they are preferably packed positively in such receptacles; that is to say, I do not necessarily have to rely on gravity to densify the material in the receptacle. An apparatus involving my invention is rapid and effective in operation.

In the drawings accompanying and forming a part of this specification, I illustrate in detail one form of embodiment of the invention which to enable those skilled in the art to practice said invention, I will fully set forth in the following description, while the novel features of said invention will be included in the claims succeeding said description.

In the drawings, Figure 1 is a side elevation of weighing, bagging and packing apparatus embodying my invention and showing the weighing mechanism as just having completed a load, the load however not having been discharged from the bucket of said weighing mechanism. Fig. 2 is a similar view, the load having been just discharged by the bucket, and the supply valve being closed, and Fig. 3 is a front elevation of the said apparatus with a portion removed and with the parts in positions corresponding to those which they are represented as occupying in Fig. 2.

Similar numerals of reference refer to like parts throughout the several views.

The charges of material to be supplied to bags are made up preferably in the bucket of weighing mechanism, and this weighing mechanism may be of any suitable character, such for example, as that disclosed in several Letters-Patent granted to me, one of which is numbered 760,485, of May 24, 1904, entitled automatic weighing machine. The different parts of the weighing mechanism may be carried upon framework denoted in a general way by 2 with which is illustrated as connected a vertically disposed column or standard 3, the bagging mechanism hereinafter described being directly coöperative with said column 3.

The weighing mechanism is represented as having a bucket or weighing hopper 4 having a delivery opening in its bottom controlled by a discharge gate or closer as 5 hinged to the bucket. In connection with the discharge valve or closer 5 is a toggle illustrated as consisting of a link 6 and an angle lever as 7 mounted pivotally upon the bucket, the short arm of said angle lever being jointed to the link or rod 6 and the latter in turn being operatively connected with the closer 5. When the two members 6 and 7 are in their operative or closer locking position the centers of the toggle made up of the two parts 6 and 7 will be in line. When, however, said toggle centers are thrown out of line, the closer 5 will be released and will be forced open by the load of material in the bucket resting thereon, as is shown in Fig. 3. When the material is free of the closer or valve 5, the latter is shut as by a counterweight 8 and when said closer is shut the several centers of the toggle will be in line all substantially as set forth in the patent to which I have hereinbefore referred. The stream supplying means for the bucket 4 includes a supply hopper 9 coactive with which, as will hereinafter appear, is a feeder, so as to adapt the apparatus to materials which do not flow freely such as flour. The hopper 9 discharges a stream of material into the upper open side of the bucket 4, the discharge of which, as will also hereinafter appear, is controlled by a bagging device. The beam which sustains the bucket 4 is denoted by 10 and as usual is counterweighted.

The toggle composed in the present instance of the members 6 and 7 constitutes a simple means for locking the closer 5 shut during the make-up of a load in the bucket. The toggle breaking device is designated by 11 and is jointed between its ends to the lever 12 of slightly angular form mounted at its angle for oscillation upon the framework 2. To the upper end of this lever 12 I have represented as pivoted one end of the rod 13, the opposite end of said rod being represented as jointed to the extreme upper end of the lever 14 pivotally supported between its ends on the framework 2. The lever 14 is shown as having a projection 15, the function of which will hereinafter appear and this projection 15 is preferably made in the form of an anti-friction roller.

In Fig. 1 the parts are represented in the positions they occupy when a load is made up in the bucket 4. To release this load the toggle composed of the members 6 and 7 is broken and this result may be accomplished by the lever 11 imparting a sudden blow to the lever 7 near the free end of the latter. The lever 14 in the present case is actuated by a cam designated by 16 and movable with the bag supporting platform or elevator 17, the body of said platform or elevator being designated by 18 and being suitably vertically guided by the column 3. The cam 16 to which I have referred constitutes a convenient device for tripping the lever 14 for effecting the discharge of the contents of the bucket 4, the operative surface of said cam being designated by 20 and being adapted to ride against the projection 15 for securing the discharge of said bucket.

The bucket discharges into the large hopper 21 which directs the material into the spout 19, the two parts being rigidly connected together in any suitable way and the spout serving to guide the material into a bag supported upon the platform 17.

In the spout 19 I have illustrated a feed screw 22, the shaft 23 of which extends upward from said feed screw and is shown as driven by bevel gearing denoted in a general way by 24 from the continuously operable shaft 25. The feed screw 22 positively delivers the material from the spout 19 into the bag and packs such material therein. I prefer, as will be understood, to run the packing or feed screw continuously and I find that I can run the same at a very high speed and thereby materially add to the efficiency of the apparatus.

In connection with the platform or table 17 I provide a weight 26 of any desirable form and which in the present instance has a vertical movement in the cylinder 27, a band, chain or rope as 28 extending from the weight 26 to the body of the elevator 17 and passing over a suitable sheave or pulley as 29 rotatably supported by the column 3 near the head thereof. When this weight 26 drops it will raise the platform or elevator 17 with a bag thereon and when the ascending motion of the elevator is practically completed the cam surface 20 will ride against the projection 15 to trip the lever 14 and effect the discharge of the load from the bucket 4, the load passing from the bucket into the hopper 21, and from thence into the tube 23 which directs the material into the bag on the platform 17 which bag encircles the spout 19, as shown for example in Figs. 2 and 3. The weight 2 corresponds with the weight of the bag to be filled and fits fairly closely within the tube 27 so that the air between the bottom of the weight 26 and the bottom of said tube 27 can be utilized for checking the descent of said weight and necessarily the ascent of the platform 17, by reason of which the cam 16 will not injure the lever 14 nor any of the parts associated therewith. To insure steady motion of the weight 26 I may coat the interior surface of the tube 27 with some suitable lubricant.

The supply hopper 9 is equipped with the usual valve, in connection with which a toggle operates. This toggle is represented in the drawings as composed of the two links 30 and 31. Connected to the two toggle members 30 and 31 at their junction is a pendent rod 32 which coöperates with the beam 10, as in the Letters-Patent to which I have referred, and which is connected at its lower end to one end of the lever 11, the opposite end of said lever being adapted, as hereinbefore explained, to break the closing locking toggle. When the supply valve is closed the toggle members 30 and 31 will be alined as shown in Figs. 1 and 2, the load in the bucket 4 at this time being complete. The load, however, is not released by means connected with the weighing mechanism, but is released by means connected with a bag supporting platform as 17 and occurs, as previously explained, when the cam 16 shifts the lever 14.

It will be assumed that a load is made up in the bucket 4 and that the platform 17 is down. To fill a bag the following procedure is adopted: The bag is placed on the platform 17 with the mouth thereof around the lower end of the spout 19, the packing screw 22 in which at this time is operating. The weight 26, in descending, elevates through the intermediate rope 28 the said bag supporting table 17, and when the latter has practically reached the limit of its upward movement the cam surface 20 will ride against the projection 15 at the lower end of the lever 14 for tripping said lever, as shown in Fig. 2. When the lever 14 is tripped or swung over as shown in said Fig. 2, the lever 11 is carried forcibly against the lever 7, as hereinbefore set forth to break the closer locking toggle of which said lever 7 forms a member. When the said toggle is thus broken the closer 5 is released, the material falling from the bucket 4 into the hopper 20 and from thence into the tube or spout 19 which brings such material into the bag. The screw feeds the material into the bag, packs the same therein and causes the descent of the bag with the platform. As soon as the bucket discharges its load, the closer 5 can be shut as is the custom, following which the beam and bucket are returned to their original positions by the descent of the ordinary counterweight connected with said beam. Another load can, therefore, be weighed, while the material is being packed into the bag and the load will not be released until the platform 17 is again elevated by the dropping of the weight 26. From this it will be understood that as soon as the packing operation commences the upper end of the cam 16 remains in position long enough to allow the returning lever 7 to break the toggles 30 and 31 and to move away from the lever 14 soon enough to prevent a second discharge which takes place after said lever 14 has returned to its original position.

What I claim is:

1. The combination of a platform mounted for rising and falling motion, a spout, weighing mechanism involving a load receiver, a door for discharging the contents of the load receiver, a toggle controlling the discharging movement of said door, means for directing said contents into said spout, a continuously operable feed screw in said spout for packing the material in a receptacle on said platform, and a releasing lever coöperative with said toggle and arranged to be engaged by said platform when the latter reaches a predetermined position.

2. The combination of a platform mounted for rising and falling motion, a spout, weighing mechanism involving a load receiver, a discharge door, a toggle for locking said door, means movable with the platform for unlocking said toggle and effecting the discharge of the contents of said load receiver, means for directing such contents into said spout, and a feed screw in the spout for packing the material in a receptacle supported on said platform.

3. The combination of a platform mounted for rising and falling motion, a spout, weighing mechanism involving a load receiver, a discharge door, a toggle for locking it, a releasing lever for the toggle, means movable with the platform and coöperative with said releasing lever for effecting the discharge of the contents of said load receiver, means for directing such contents into said spout, and a continuously operable feed screw in said spout for packing the material in a receptacle on said platform and for causing thereby the lowering of said platform.

4. The combination of a platform, a spout for delivering material into a receptacle supported on said platform, weighing mechanism including a load receiver, means for discharging the contents of said load receiver, means for directing such contents into said tube, a weight, an operative connection between the weight and the platform to secure the elevation of the latter on the descent of the weight, and a tube in which said weight is comparatively snugly fitted for upward and downward motion, said tube being closed below the weight.

5. The combination of a platform, a spout for delivering material into a receptacle supported on said platform, weighing mechanism including a load receiver, means for discharging the contents of said load receiver, means for directing such contents into said tube, a weight, an operative connection between the weight and the platform to secure the elevation of the latter on the descent of the weight, a tube in which said weight is comparatively snugly fitted for upward and downward motion, said tube being closed below the weight, and a continuously operable feed screw in said spout for packing material and for causing the descent of the platform.

6. The combination of a platform mounted for rising and falling motion, and for supporting a bag, weighing mechanism including a load receiver, a toggle for normally preventing the discharge of the contents of said load receiver, releasing means capable of delivering a blow upon said toggle and means movable with said platform and coöperative with said releasing means for effecting positively the discharge of the contents of said load receiver.

7. The combination of a platform mounted for rising and falling motion, weighing mechanism including a load receiver having a closer and a toggle for normally locking the closer against movement, means controlled by said platform and capable of delivering a blow upon said toggle for breaking the same, and means for delivering the load of material from said bucket into a bag on said platform.

8. The combination of a movably mounted bag supporting platform, weighing mechanism involving a load receiver, a toggle for normally preventing the discharge of a load from said load receiver, a releasing device capable of delivering a blow upon said toggle, and means including a cam device movable with said platform and coöperative with said releasing device, for causing positively the discharge of the contents of said load receiver.

9. The combination of a movably mounted platform, weighing mechanism involving a load receiver, a toggle for normally preventing the discharge of the contents of said load receiver, a releasing lever capable of delivering a blow upon said toggle and a cam rigidly connected with said platform and capable of imparting a quick movement to said lever to cause positively the discharge of the contents of said load receiver.

10. The combination of weighing mechanism involving a load receiver, a toggle for normally preventing the discharge of a load from said load receiver, a lever, a bag supporting platform mounted for rising and falling movements, a cam connected with the platform for actuating said lever, and means operative from the lever when the same is actuated by said cam for imparting a blow to said toggle to cause positively the discharge of the contents of said load receiver.

11. The combination of a platform mounted for rising and falling motion, a tube, a weight arranged to travel in said tube, the latter being closed below the weight, means for connecting the weight and platform for causing the latter to ascend when the weight descends, a spout, weighing mechanism involving a load receiver, means for normally preventing discharge of the contents of said load receiver, a cam connected with the platform, and means operative by said cam for causing positively the discharge of the contents of said load receiver.

12. The combination of a platform mounted for rising and falling motion, a tube, a weight arranged to travel in said tube, the latter being closed below the weight, means for connecting the weight and platform for causing the latter to ascend when the weight descends, a spout, weighing mechanism involving a load receiver, means for normally preventing discharge of the contents of said load receiver, a cam connected with the platform, means operative by said cam for causing positively the discharge of the contents of said load receiver, and a screw in said spout for packing material in a receptacle on said platform, and for also lowering said platform.

13. The combination of a support for a load receiver, a load discharging device, said support and discharging device being relatively movable, a toggle for normally locking the load discharging device, and controlling means for the load discharging device operable automatically during a relative movement of one of said parts to impart a blow to said toggle.

14. The combination of a support for a load receiver, a load discharging device, said support and discharging device being relatively movable, a toggle for normally locking the load discharging device, releasing means capable of imparting a blow to said toggle, and controlling means for the releasing means for the load discharging device releasable automatically after the support and load discharging device have assumed a coöperative relation.

15. The combination of a platform for supporting a receptacle and mounted for ascending and descending motion, weighing mechanism including a load receiver, the load receiver being arranged to discharge its contents into the receptacle on said platform, a rod rigidly connected with the platform, rising therefrom and provided at its upper end with a cam surface, and means against which the cam surface acts when the platform is up to cause the discharge of the contents of said bucket.

16. The combination of weighing mechanism including a bucket and a toggle to normally prevent discharge of the contents of said bucket, a platform mounted for rising and falling movement and adapted to support a receptacle to receive the load from said bucket, a lever, a cam movable with the platform and adapted to operate said lever when the platform is in its upper position, and means actuated by said lever when the same is operated by said cam for breaking said toggle.

17. The combination of a platform mounted for rising and falling motion and adapted to support a receptacle, weighing mechanism including a load receiver, a toggle to prevent normally the discharge of the contents of said load receiver, a lever to break said toggle, a second lever on the load receiver for operating the first lever, a third lever linked to the second lever, and a cam movable with the platform for operating the third lever and causing the same through the intermediate connections to operate the first lever in a direction to break said toggle and cause the load receiver to discharge its contents into a receptacle on said platform.

In testimony whereof I have hereunto set my hand in presence of two subscribing witnesses.

HENRY RICHARDSON.

Witnesses:
  A. E. GODFREY,
  M. M. RONNIE.